United States Patent Office 3,100,889
Patented Aug. 13, 1963

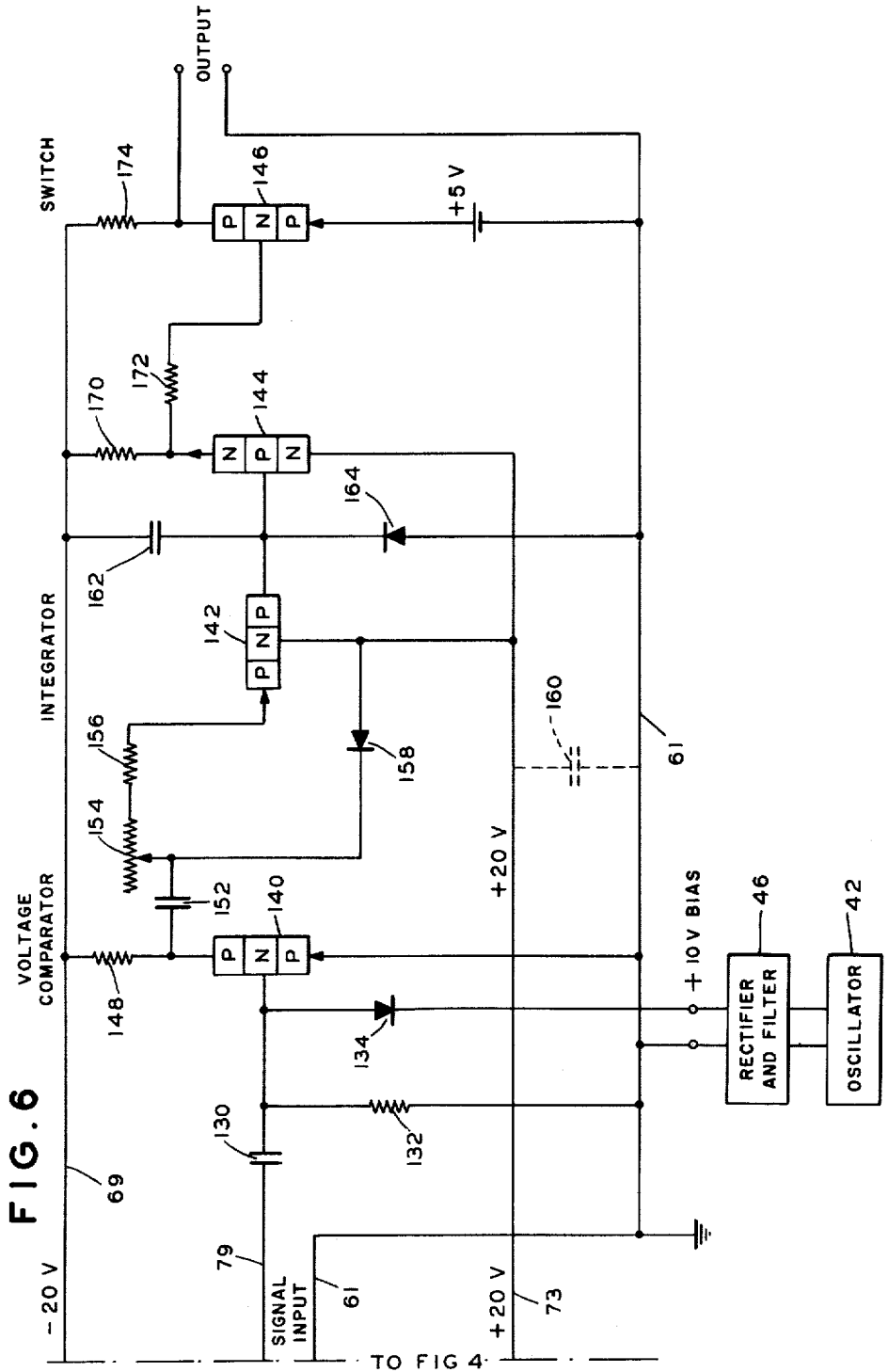

3,100,889
APPARATUS FOR SENSING VARIATIONS
Maxwell R. Cannon, Endicott, N.Y., assignor to International Business Machines Corporation, New York, N.Y., a corporation of New York
Filed Apr. 17, 1958, Ser. No. 729,148
3 Claims. (Cl. 340—259)

This invention relates to means and a method for continuously sensing variations in a linear quantity or dimension and for giving an indication when the variation exceeds a predetermined tolerance.

An illustrative embodiment is given in which the quantity which may vary is the width of a moving sheet or web of material which is being fed from a source of supply such as a supply reel to a processing machine such as a high speed printing press.

In accordance with the invention, provision is made to continuously monitor the width of a rapidly moving web. The system produces a signal whenever the web width variation exceeds certain specified tolerances. It may be arranged that small deviations in web width will not produce a signal if they do not persist but will produce a signal if they are sufficiently long continued without interruption. Large deviations even though of very brief duration may produce a signal. Lateral motion of the web is accommodated without a reduction in the accuracy of the system, and will not produce a signal.

In the embodiment illustrated, a pair of sensing elements having jeweled bearing surfaces continuously ride along the respective edges of the running web. The sensing elements are rigidly connected respectively to movable core elements in a pair of linearly variable differential transformers. The primary windings of the transformers are connected to a source of alternating current, the impedance of the source being preferably low relative to the combined input impedance of the transformers. The secondary windings of the two transformers are differentially connected. Normally both transformer cores are centrally located each within its transformer so that there is no output from either transformer. Lateral motion of the web without change of web width causes equal output voltages to be produced in the two secondary windings. These voltages are proportional to the displacement of the core from the normal position but the voltages are opposed due to the differential connection of the two secondary windings. Hence, no net output results. Any change in web width, however, whether an increase or a decrease from normal, produces unequal voltages in the two secondary windings and results in a net output which is proportional to the deviation from normal width.

The output from the transformer secondary circuit, amplified as need be, is delivered to an amplitude selecting system to determine whether or not an indicating or warning signal shall be produced. The amplitude selecting system comprises a voltage comparator, and an integrator, and is arranged to operate a switch when a signal or alarm is to be given.

In the voltage comparator, the amplified transformer output voltage is compared with a reference voltage which is obtained by rectifying and filtering a portion of the alternating supply voltage from the source which feeds the transformer primary windings. Thus, variations in the source result in proportional variations in both voltages to be compared. This results in high accuracy because the compensating action reduces the effect of voltage variations in the source. The voltage comparison may be made in a circuit which employs semi-conductor devices such as transistors. If the peak value of the amplified wave exceeds the reference voltage, the voltage comparator develops a pulse corresponding to the portion of the peak value which exceeds the reference value. A succession of such pulses are integrated in the integrator. When the integrated result reaches a predetermined voltage level the switch is operated to produce a signal which may be used to give an indication, actuate an alarm, or for any other purpose. In particular, the signal may be employed to effect the rejection of material which shows variation in width in excess of the predetermined tolerance.

An object of the invention is to enable the rejection of material of off-standard dimensions beyond a predetermined tolerance while the material is in rapid motion.

Another object is to avoid unnecessary interference with a fabricating or other process utilizing the material, due to small variations in material dimensions when these variations are of not too long duration.

A further object is to ensure rejection of material whenever a relatively large dimensional variation occurs even though the variation is of very brief duration.

Other features, objects and advantages will appear from the following more detailed description of an illustrative embodiment of the invention, which will now be given in conjunction with the accompanying drawings in which FIGURE 1 is a diagram, partly schematic and partly in block form, showing a system in accordance with the invention;

FIGURE 6 is a schematic diagram of the portion of the system of FIGURE 1 comprising a voltage comparator, an integrator and an electronic switch together with suitable interconnections therefor.

Figure 1:
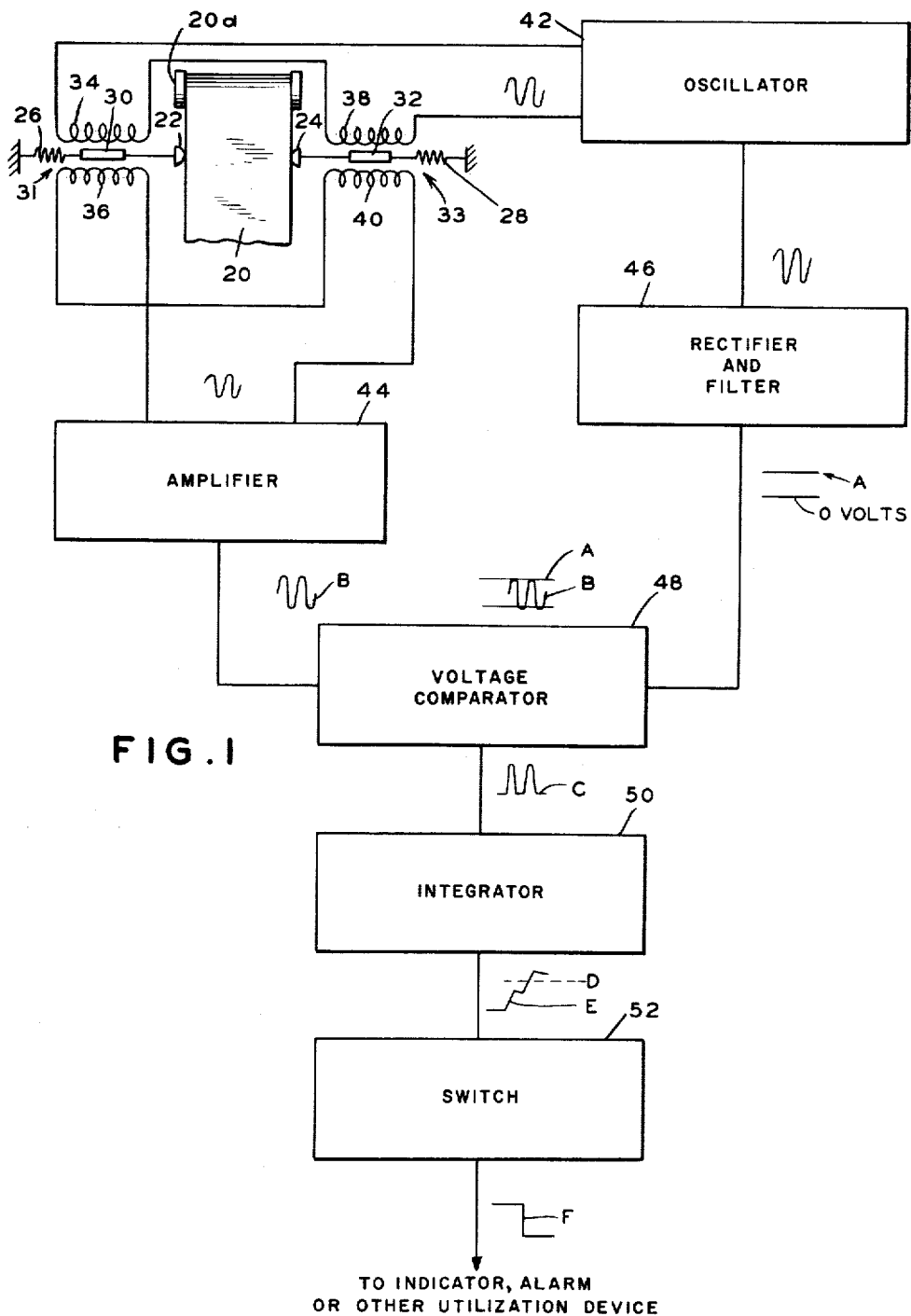

In FIGURE 1, a sheet or web 20 of material is shown, which may be, for example, paper, leather or other material which may be drawn from a supply roll 20a and which is fed to a processing device, for example, a printing press or some fabricating machine, etc. For the sake of clarity in the drawing, the supply roll 20a is shown but the processing device is omitted from the figure, inasmuch as it may be conventional and since particulars thereof are not directly involved in the invention. Sensing devices 22, 24 which preferably have jeweled surfaces are mounted adjacent to the respective sides of the web 20 and are provided with means such for example as springs 26, 28, respectively for lightly urging the sensing devices against the web. Rigidly attached to the respective sensing devices are movable magnetic core pieces 30, 32 positioned respectively between the primary and secondary windings of transformers 31, 33. The core 30 is located between the primary winding 34 and secondary winding 36 of the transformer 31 and the core 32 is located between the primary winding 38 and secondary winding 40 of the transformer 33. The transformers 31, 33 are preferably of the linearly variable differential type with matched voltage characteristics with respect to core displacements.

The primary windings 34, 38 are connected, for example serially, to an oscillator 42 which is of moderately high frequency, e.g., 20 kc. The secondary windings 36, 40 are connected in voltage opposing relation, for example opposed serial connection, to the input of an amplifier 44. The oscillator 42 is also connected to a rectifier and filter combination 46. The outputs of the amplifier 44 and the rectifier and filter combination 46 are connected to a voltage comparator 48. The output of the voltage comparator is connected to the input of an integrator 50 the output of which is in turn connected to a switch 52, which latter may be in a circuit with an indicator or alarm of any desired kind or any desired utilization device.

Figure 2:
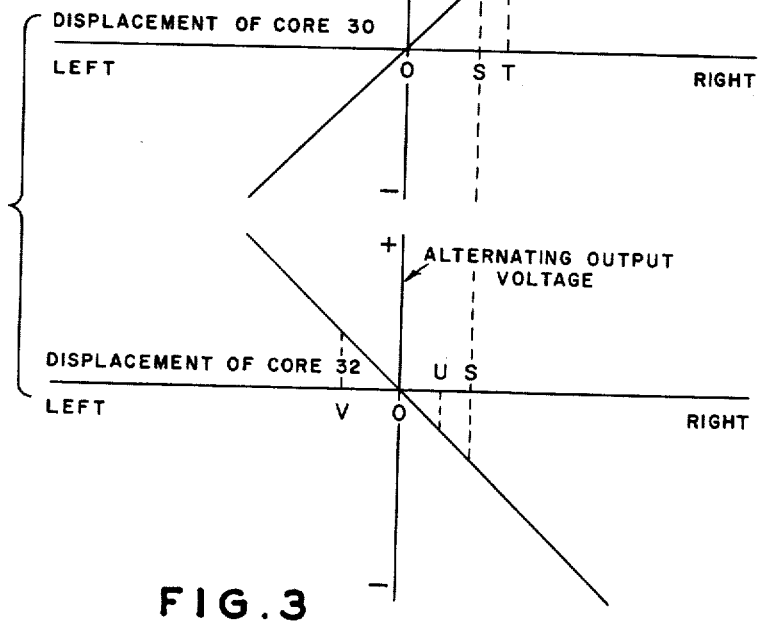
FIGURE 2 is a set of graphs useful in explaining the operation of a pair of transformers shown in FIGURE 1.

The operation of the part of the system of FIGURE 1 which comprises the sensing devices and the transformers with the movable core pieces will be explained with reference to FIGURE 2. This figure shows the idealized voltage vs. core displacement graphs for a matched pair of linearly variable differential transformers such as are preferred for use as transformers 31 and 33 in the system of FIGURE 1. By virtue of the differential nature of each transformer there is a unique position of the core that produces a null output from the transformer. This position of the core will be referred to as the null position of the core for the transformer in question. The upper graph in FIGURE 2 shows the alternating output voltage in the secondary winding 36 as a function of displacement of the core 30 from the null position of the core for the transformer 31. Displacement of the core to the right from the null position produces an alternating output voltage of one phase, arbitrarily designated positive phase on the graph. Displacement of the core to the left from the null position produces an alternating output voltage of the opposite phase from that produced by displacement to the right regardless of the original choice of arbitrary phase. The lower graph shows the alternating output voltage in the secondary winding 40 as a function of displacement of the core 32 from the null position of the core for the transformers 38, 40. Displacement of the core 32 to the right from its null position produces in the secondary circuit connected in opposing relation as in FIGURE 1 an alternating output voltage of the opposite phase from that produced by the displacement of the core 30 to the right from its null position. Due to the linearly variable feature of the transformers the alternating output voltage of each transformer is linearly proportional to the core displacement and, by virtue of the use of a pair of matched transformers, the alternating output voltages in the secondaries 36 and 40 are equal for equal displacements of the respective cores from their null positions.

Thus, if both cores are in their respective null positions there is substantially no output voltage from either transformer. This condition is indicated at the origin O in the upper and lower graphs. If both cores are moved the same distance in the same direction, as for example to point S, the alternating output voltages of the two transformers are no longer zero but are equal in amplitude and opposite in phase, again producing no resultant output voltage. If the cores 30 and 32 respectively are displaced by any unequal amounts, a non-zero resultant output voltage is developed, as when core 30 is at point T with core 32 at S, U or V, for example, or when core 30 is at S and core 32 is at U or V, and similarly for any unequal displacements of the cores from their respective null positions. Of course in practice the voltage characteristics will depart slightly from the ideal relationships shown in FIGURE 2, but in general equal displacements will produce very little output voltages that are nearly linearly proportional to the difference between the displacements. So any change in separation of the cores from the normal separation results in a secondary voltage output having an amplitude substantially proportional to the change in separation.

Since the sensing surfaces 22, 24 may be urged against the edges of the web, as by compression of the spring means 26, 28, the distance between the sensing surfaces represents the width of the web 20. It is usually preferable that the pressure exerted upon the web be relatively low. Because the sensing members are rigidly attached to the respective transformer cores, the output from the connected windings 36, 40 indicates the distance between the sensing surfaces regardless of their actual positions, within the linear operating range of the transformers. Thus the output indicates the web width even though the web may weave back and forth a moderate amount within the sensing area. It is preferred that the initial adjustment of the sensing system be made with the web in normal position centered with respect to its entry into the processing machine and with each of the cores in its null position. The distance of each sensing element from its associated core is then determined and the sensing element is rigidly attached to the core by a member of proper length. The springs may then be adjusted to give the desired pressures.

The operation of the remainder of the system may be explained with reference to FIGURE 3. In that figure, trace A represents a reference voltage obtained from the oscillator 42 by means of the rectifier and filter combination 46 in conventional manner. The reference voltage reflects any variations in the voltage output of the oscillator and so makes the voltage comparison to a large degree independent of the oscillator fluctuations. Trace B shows the output wave from the amplifier 44. This wave is an alternating one with the base of alternations clamped to reference potential, indicated by line A at about plus 10 volts, which represents the tolerance which is to be permitted in the width of the web. The left hand portion of the figure shows the condition that prevails when the width of the web is within the tolerance. Then the trace B does not intersect the zero axis resulting in no output from the voltage comparator 48.

Figure 3:
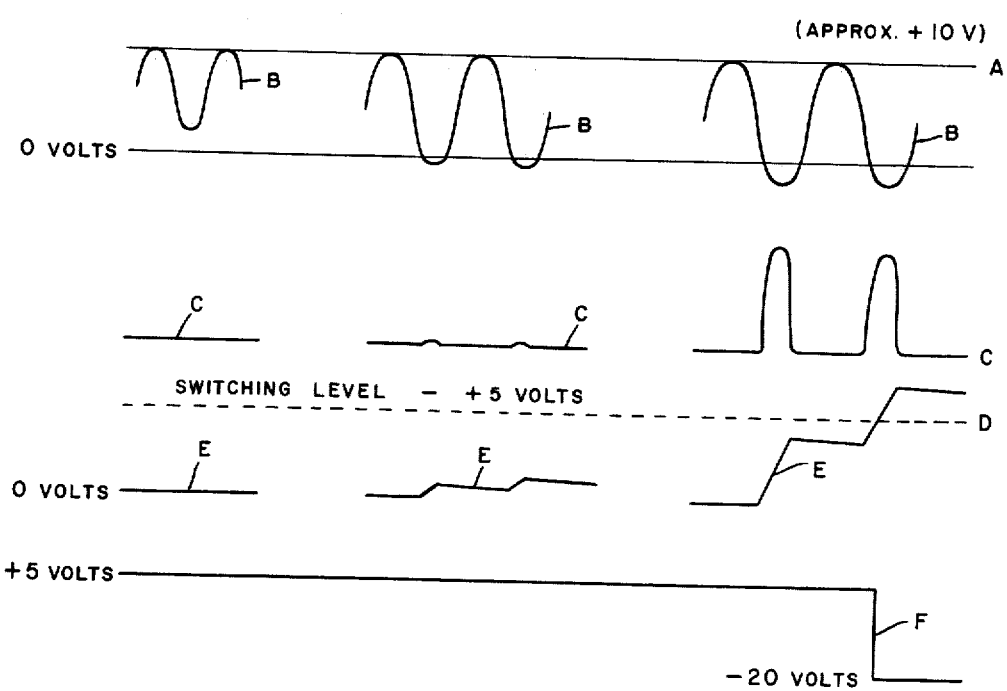
FIGURE 3 is a set of illustrative wave forms to be found in various portions of the system of FIGURE 1.

The middle portion of FIGURE 3 shows the condition which prevails when the width of the web varies from normal by an amount which is slightly over the tolerable variation. In this case the width may be either greater or less than normal. The amplitude of trace B is now sufficiently great to intersect the zero axis resulting in an output voltage during a small portion of each cycle. The righthand portion of FIGURE 3 shows the condition which prevails when the width of the web varies from normal by an amount considerably over the tolerable value. In this case there is an output voltage over a greater portion of the cycle than in the previous case. Trace C shows the resultant output from the voltage comparator in the three cases. There is no output from the comparator when the web width is within tolerance. For slight excess over tolerance relatively small output pulses are delivered by the comparator. When the excess over tolerance is considerable the output pulses from the comparator are of greater magnitude as indicated.

Trace D represents the switching voltage level in the integrator 50. In the embodiment illustrated this level is plus 5 volts. Trace E represents the output of the integrator. This device integrates the pulses received from the voltage comparator. There is no output from the integrator when the web width is within tolerance. When there is a slight excess over tolerance the integrator ouput steps up slightly for each pulse received. Between pulses the integrated voltage falls off slightly. If the pulses continue for a sufficient period the output of the integrator will eventually reach the switching level, but if normal web width quickly follows the deviation the switching level will not be attained and the integrator output voltage will gradually fall back to zero. When there is a considerable excess over tolerance the integrator output increases in a large step as each pulse is received from the comparator. The switching level is quickly reached and an operating pulse is transmitted to the switch 52 to actuate any desired type of utilization device, as for example an indicator or alarm or some means to stop the processing device or reject the unsatisfactory material. Trace F shows a typical switching wave produced by the switch. In the embodiment illustrated the switch operates between a plus 5 volt level in the inactive state and a minus 20 volt level in the operated state.

Figure 4:
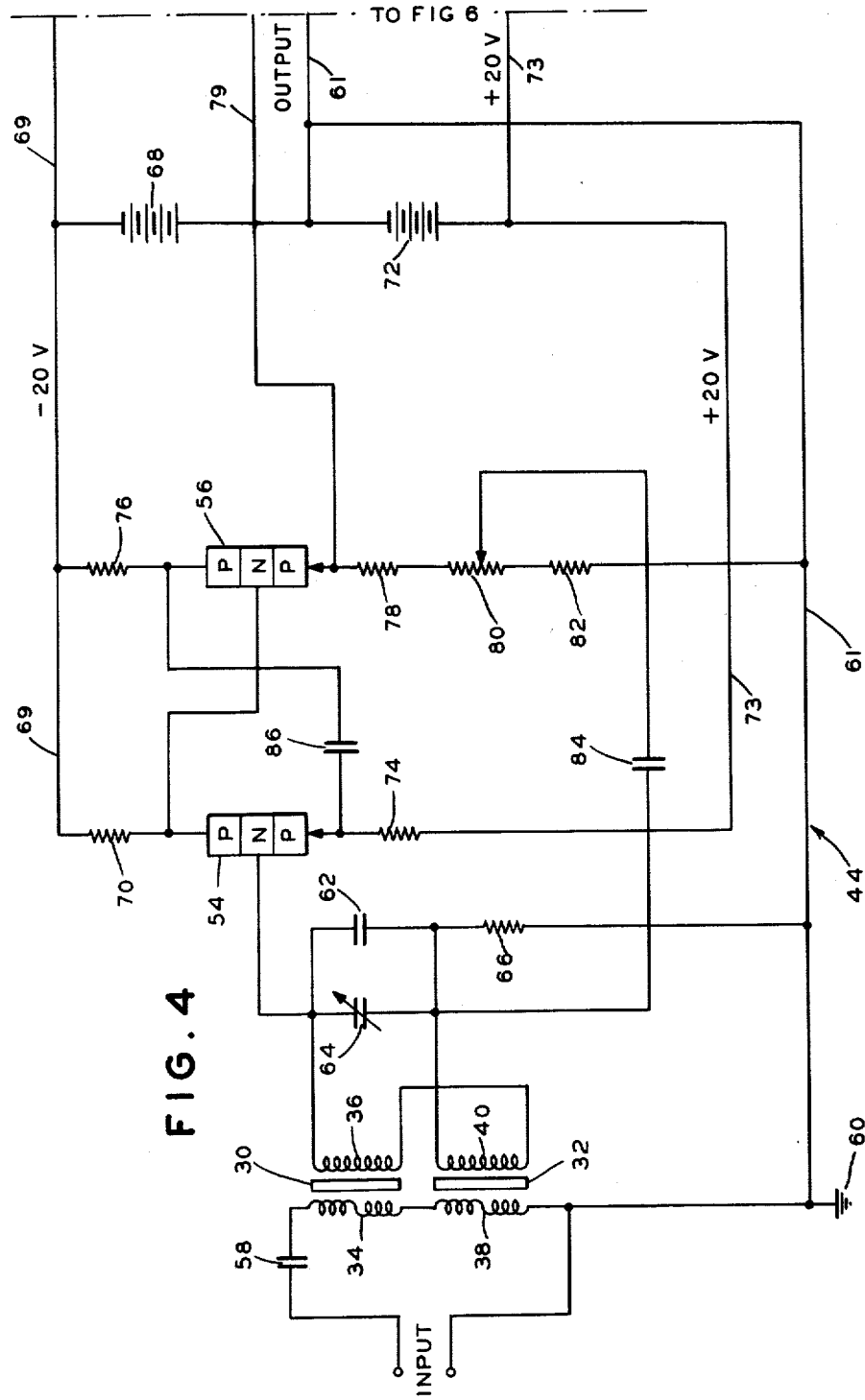
FIGURE 4 is a schematic diagram of a low-gain amplifier which may be used as the amplifier which is indicated by the block 44 of FIGURE 1.

Two-stage amplifier 44 is best shown in FIGURE 4 and may provide a voltage amplification of about 20 to 50 times. The figure includes for clarity the transformers and the mode of coupling between the transformers and the first stage of the amplifier. The transistors 54, 56 are both of the p-n-p type and are shown in block schematic form with the emitter terminal at the bottom indicated by an arrow and with the collector terminal at the top. The base terminal is shown at the middle of one side.

The input terminals shown in FIGURE 4 are the terminals by which the output of oscillator 42 is connected to the transformer primary windings 34, 38. The connection to primary 34 may be made through a coupling capacitor 58 and one point of the primary circuit may be grounded as at 60. The secondary circuit may be tuned by means of a capacitor 62 and the phase of the wave in the secondary circuit may be adjusted by means of a trimmer capacitor 64. One end of the tuned secondary circuit is grounded through a loading resistor 66. The other end of the tuned secondary circuit is conductively connected directly to the base electrode of transistor 54. The collector electrode of transistor 54 is connected to a negative biasing source 68 through a loading resistor 70 and conductor 69. The emitter electrode is connected to a positive biasing source 72 through a loading resistor 74 and conductor 73. The sources 68, 72 having a common grounded terminal being connected to grounded conductor 61. The emitter electrode is given a relatively low impedance connection to ground effective at the operating frequency by means of a capacitor 86, a low impedance resistor 76 and the biasing source 68, so that this stage of the amplifier constitutes a common-emitter stage.

The transistor 54 is coupled to the transistor 56 by means of a direct conductive connection from the collector of transistor 54 to the base electrode of transistor 56 as shown. The transistor 56 has its collector electrode connected to the negative biasing source 68 through the low impedance resistor 76 and its emitter electrode connected to the positive biasing source 72 through a loading resistor 78, a feed back potentiometer 80, and an auxiliary resistor 82. Because of the low impedance connection of the collector electrode to ground through the resistor 76 and biasing source 68, this stage of the amplifier constitutes a common-collector stage. In general the biasing sources will present relatively little impedance at the operating frequency, either because of low inherent impedance or because of considerable inherent shunt capacitance, or both. The output of the transistor 56 is obtained between the emitter electrode and ground by means of conductors 79 and 61 respectively connected thereto. A negative feedback path is established from the movable arm of a potentiometer 80 through a feedback capacitor 84 to the ungrounded end of the loading resistor 66 which is in the base circuit of the transistor 54. Another negative feedback path is provided from the collector electrode of transistor 56 through the capacitor 86 to the emitter electrode of transistor 54.

In the operation of the amplifier 44, shown in FIGURE 4, the first stage, a common-emitter stage, furnishes both voltage and current amplification or gain. The stage has a high input impedance in order to avoid material loading of the transformers which if it occurred would impair the linearity of response of the transformers.

The second stage, a common-collector stage, provides current amplification at substantially the input voltage. The negative feedback through the feedback capacitor 84 serves to control the gain of the amplifier, to linearize the input-output relationship, and to increase greatly the otherwise low input impedance of amplifiers of the common emitter type. The negative feedback through the capacitor 86 serves to minimize oscillations and increase stability.

Figure 5:
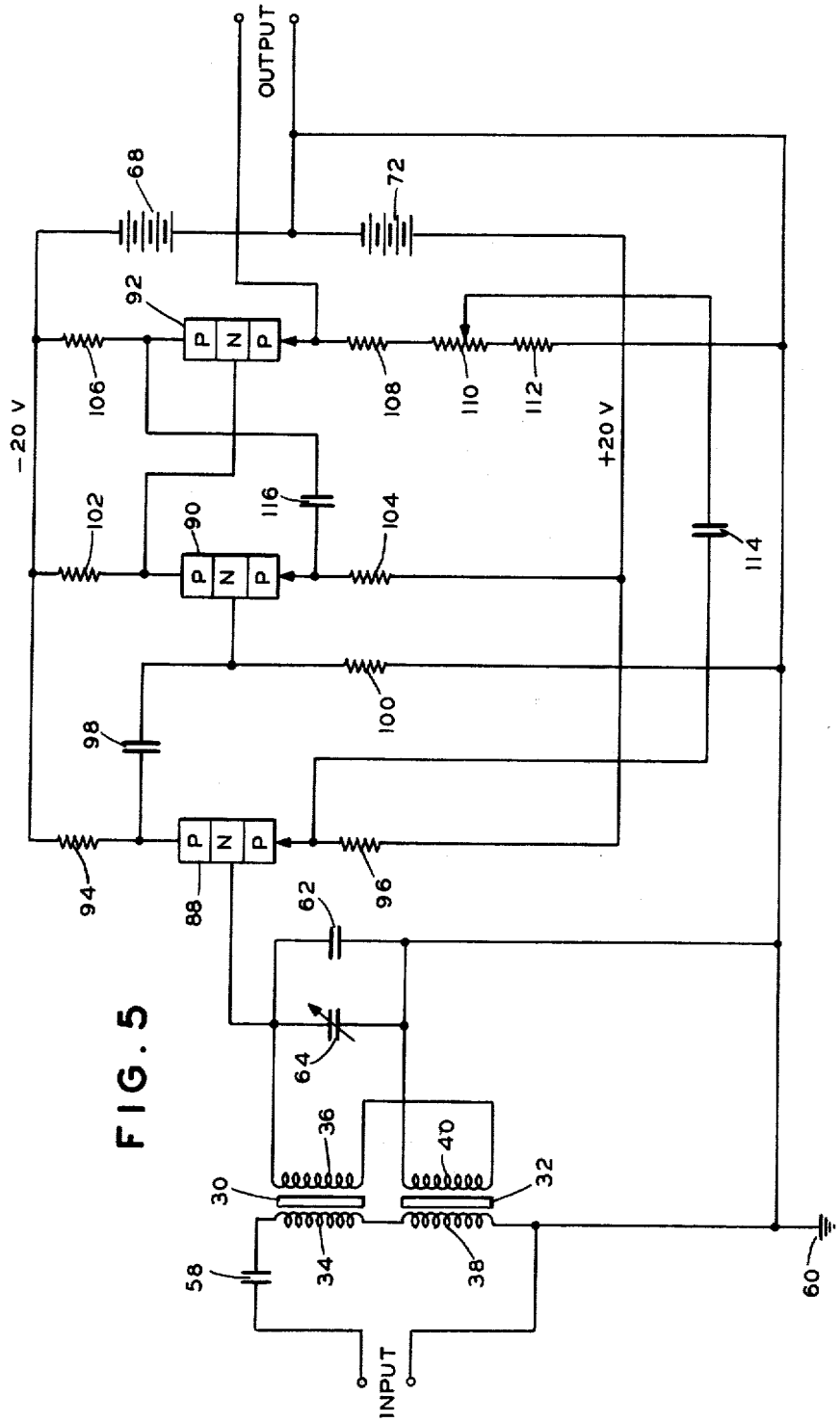
FIGURE 5 is a schematic diagram of a high-gain amplifier which may be used in certain circumstances in place of the amplifier shown in FIGURE 4.

FIGURE 5 shows a three-stage transistor amplifier which may be used in place of the amplifier 44 when a higher voltage gain is desired than is available with the amplifier of FIGURE 4. The voltage gain for the amplifier of FIGURE 5 may attain a value as high as 100 to 300 in output-input voltage ratio. Like the amplifier of FIGURE 4, this amplifier provides a high impedance across the secondary circuit of the transformers so as to load the transformers as little as possible. The transistors in the successive stages are designated 88, 90, 92.

The base circuit of the first stage transistor 88 in the amplifier of FIGURE 5 is the same as the base circuit of the first stage transistor in FIGURE 4 except that the loading resistor 66 is not required since no feedback is applied to the base circuit in FIGURE 5. The collector electrode of transistor 88 is connected to the negative biasing source 68 through a loading resistor 94 and the emitter electrode is connected to the positive biasing source 72 through a loading resistor 96.

The transistor 88 is coupled to the transistor 90 by means of a coupling capacitor 98 connected between the collector electrode of transistor 88 and the base electrode of transistor 90. A direct current connection to ground from the base electrode of transistor 90 is provided through a high impedance resistor 100. The transistor 90 has its collector electrode connected to the negative biasing source through a loading resistor 102 and its emitter electrode connected to the positive biasing source through a loading resistor 104.

The transistor 90 is coupled to the transistor 92 by means of a direct conductive connection from the collector electrode of transistor 90 to the base electrode of transistor 92. The collector electrode of transistor 92 is connected to the negative biasing battery through a low impedance resistor 106. The emitter electrode of transistor 92 is grounded through a serial path comprising a loading resistor 108, a feedback potentiometer 110 and an auxiliary resistor 112. The output of the transistor 92 is obtained between the emitter electrode and ground. A negative feedback path is provided between the movable arm of potentiometer 110 and the emitter electrode of transistor 88 through a feedback capacitor 114. Another feedback path is provided between the collector electrode of transistor 92 and the emitter electrode of transistor 90 through a feedback capacitor 116.

In the operation of the amplifier of FIGURE 5, the first stage, a modified common-emitter stage, furnishes both voltage and current amplification. The stage has a high input impedance in order to avoid material loading of the transformers which if it occurred would impair the linearity of response of the transformers. At the operating frequency of the amplifier the emitter of transistor 88 has a low impedance path to ground through the feedback capacitor 114, the potentiometer 110 and the resistor 112, whereby the stage operates substantially as a common-emitter stage.

The second stage is another common-emitter stage, contributing further amplification of both voltage and current. At the operating frequency of the amplifier the emitter of transistor 90 has a low impedance path to ground through capacitor 116, low impedance resistor 106 and biasing source 68.

The third stage is a common-collector stage, supplying current amplification only. The collector of transistor 92 has a low impedance path to ground through low impedance resistor 106 and biasing source 68. The negative feedback from the third stage to the second stage through the capacitor 116 serves to minimize oscillations and increase stability. The negative feedback from the third stage to the first stage through the capacitor 114 serves to control the gain of the amplifier, to linearize the output-input voltage relation, and to increase greatly the normally low input impedance of the common-emitter amplifier.

FIGURE 6 shows a preferred embodiment of the portion of the system of FIGURE 1 comprising the voltage comparator 48, the integrator 50, and the switch 52. The figure also shows diagrammatically the oscillator 42, the rectifier-filter unit 46 and the way in which the reference voltage for the voltage comparator is obtained from the oscillator and impressed upon the voltage comparator. The signal input shown is obtained from the amplifier 44. A coupling capacitor 130 is connected to conductor 79 and in series with an input loading resistor 132 which is in turn connected to grounded conductor 61. The positive output terminal of the rectifier-filter unit 46 is connected through a clamping diode 134 to the common junction of capacitor 130 and resistor 132 and to the base electrode of a transistor 140, the negative output terminal of the unit 46 being grounded. In addition to the transistor 140 which with its associated circuits serves as the voltage comparator 48, there are provided additional transistors 142, 144 and 146.

As shown in FIGURE 6 the emitter electrode of transistor 140 is grounded by means of a direct conductive connection to conductor 61. The collector electrode is connected through a loading resistor 148 and through conductor 69 to the negative biasing source 68. The input for the transistor is impressed between the base electrode and ground while the output is obtained between the collector electrode and ground. The output from this transistor is coupled to the emitter electrode of the transistor 142 through a network comprising a capacitor 152, a potentiometer 154 and a fixed resistor 156.

The transistor 142 and associated circuits serve as the integrator 50 of FIGURE 1. The base electrode of this transistor is effectively grounded at the operating frequency of the circuit by the inherent shunt capacitance 160 of positive biasing source 72 or by inherent low impedance of the source, or both. The base electrode of the transistor is conductively connected directly to conductor 73 which is in turn connected to the positive biasing source 72. Normally, the positive biasing potential is also impressed upon the emitter of this transistor through a clamping diode 158, the potentiometer 154, and resistor 156 in conjunction with capacitor 152, so that in the normal condition of the circuit there is no difference in bias voltage between the emitter electrode and the base electrode. The collector electrode is connected to conductor 69 and negative biasing source 68 through an integrating capacitor 162 and is connected to ground by a clamping diode 164.

The transistor 144 and associated circuits serve as an emitter-follower stage connecting the integrator circuit of transistor 142 with the circuit of transistor 146 and also as a means for gradually discharging the integrating capacitor 162. The transistor 144 is of the n-p-n type whereas the other transistors shown are of the p-n-p type. The emitter of the transistor 144, indicated by the arrow leaving upper n-type portion, is connected to the negative biasing source conductor 69 through a loading resistor 170. The collector is conductively connected directly to the positive biasing source conductor 73. The input for the transistor is impressed upon the base electrode by a direct conductive connection from the collector of transistor 142. The output of the transistor 144 is obtained at the emitter electrode and this electrode is coupled through a high impedance resistor 172 to the base electrode of the transistor 146, the latter together with the components associated therewith serving as the switch 62 (FIGURE 1). The collector electrode of transistor 146 is connected to negative biasing source conductor 69 through a loading resistor 174 while its emitter electrode is conductively connected to a source of relatively small positive biasing voltage indicated at 175. The output from the transistor is obtained between the collector electrode and grounded conductor 61.

In the operation of the system of FIGURE 6, the circuit elements 130, 132, 134 comprise a clamping circuit for combining an alternating current signal input from the amplifier 44, whose input is in turn derived from the transformer secondary circuit, with a reference voltage from the rectifier-filter unit 46. The signal input wave produces an alternating voltage at the base of voltage comparator transistor 140 by way of coupling capacitor 130. This voltage is shown by trace B of FIGURE 3. The diode 134, together with capacitor 130, acts as a voltage clamp to maintain the positive peaks of the sinusoidal signal at the reference potential of approximately plus 10 volts. As long as the peak-to-peak signal is less than the reference voltage, the emitter-base junction of transistor 140 is reverse biased and transistor 140 is in a nonconducting state. Any peak-to-peak signal excursion in excess of the reference voltage causes the emitter-base junction of transistor 140 to be forward biased causing collector current to flow for the duration of the forward biased period. The collector potential of transistor 140 is shown by trace C of FIGURE 3.

It will be noted that since the emitter of transistor 140 is permanently grounded and since the collector is biased to a negative potential the transistor 140 will be operative only when a suitable negative potential is applied to the base electrode. This condition will be fulfilled in the circuit shown if, and only if, the signal wave exceeds the reference voltage in amplitude, and then only during the portion of the cycle when the signal wave is negative.

Whenever transistor 140 operates, its collector potential rises. This voltage rise is coupled through capacitor 152 to the junction of diode 158 and resistor 154. Prior to the application of the positive pulse, this junction is clamped by diode 158 to plus 20 volts which is the base potential of transistor 142. The positive pulse from the voltage comparator transistor 140 through resistors 154 and 156 produces a current to the emitter of transistor 142. Negligible current flows through diode 158 during the positive pulse time. The emitter current of transistor 142 is dependent upon the amplitude of the applied pulse and the total series resistance of resistors 154 and 156. Because the collector current of transistor 142 is nearly equal to its emitter, each voltage pulse from the voltage comparator produces a current pulse into capacitor 162. When transistor 140 ceases to operate, the transistor 142 becomes inoperative again due to the clamping circuit comprising diode 158 and capacitor 152, together with the resultant decline of the collector voltage of transistor 140. The effect of the pulse remains as an increment of charge in the capacitor 162.

The transistor 144, which is connected as a common-collector stage, operates as an emitter-follower, that is, the emitter potential is always substantially the same as the base potential. Since the transistor 144 has its base potential clamped to ground potential, the emitter potential is normally ground potential. When a pulse is impressed upon capacitor 162 by transistor 142, the clamping action permits the base potential of transistor 144 to rise, thereby also raising the emitter potential by substantially the same amount. The current of transistor 144 gradually discharges capacitor 162, so that the emitter potential also gradually decreases between pulses.

When the potential of the emitter of transistor 144 rises sufficiently it eventually becomes equal to the emitter potential of transistor 146 in the switch circuit and is impressed, through resistor 172, upon the base electrode of transistor 146. Consequently, as soon as the base potential of transistor 144 goes above the emitter potential of transistor 146, the transistor 146 is rendered inoperative and the current in resistor 174 from transistor 146 ceases. Hence, the collector potential of transistor 146 changes abruptly from about plus 5 volts to about minus 20 volts in the embodiment shown. This change in output voltage of the transistor 146 constitutes a voltage step signal which may be used to operate a desired indicator or alarm or for any other purpose.

A plurality of relatively small pulses following each other in rapid succession will build up the voltage on the integrating capacitor 166 to the switching level because the slight discharge between pulses will not be sufficient to offset the building up process. Considerable intervals between pulses will permit the charge to be removed before the switching level can be reached. A small number of large pulses in quick succession will quickly reach the switching level. The system may be adjusted by variable resistor 154 so that one or two or more large pulses may occur in an isolated group without causing the switching level to be reached. Thus, unwarranted interruptions of the processing may be avoided where deviations in web width are either small and of not too long duration or large but of very brief duration. If desired, however, a switching signal may be obtained from only one or two large pulses so that material may be rejected whenever a relatively large width variation occurs even though the variation is of very brief duration.

Semiconductors, particularly transistors, are especially well adapted for performing the functions required in accordance with the invention but it will be evident that vacuum tube circuits may be substituted for transistors circuits if desired.

While it will be appreciated that the herein described circuit is subject to great flexibility in design, with a correspondingly broad selection of circuit component constants, typical values exemplifying a practical system suited to use at an operating frequency of 20 kilocycles per second, are shown in the following tabulation in connection with FIGURES 4, 5 and 6:

| Component | Reference character | Value or designation |
|---|---|---|
| Resistors | 66 | 18,000 ohms. |
| | 70 | 5,600 ohms. |
| | 74 | 10,000 ohms. |
| | 76 | 180 ohms. |
| | 78 | 3,000 ohms. |
| | 80 | 1,000 ohm potentiometer. |
| | 82 | 100 ohms. |
| | 94 | 2,700 ohms. |
| | 96 | 3,900 ohms. |
| | 100 | 39,000 ohms. |
| | 102 | 10,000 ohms. |
| | 104 | 20,000 ohms. |
| | 106 | 330 ohms. |
| | 108 | 5,600 ohms. |
| | 110 | 200 ohm potentiometer. |
| | 112 | 68 ohms. |
| | 132 | 4,700 ohms. |
| | 148 | 39,000 ohms. |
| | 154 | 10,000 ohms. |
| | 156 | 4,700 ohms. |
| | 170 | 10,000 ohms. |
| | 172 | 30,000 ohms. |
| | 174 | 8,200 ohms. |
| Capacitors | 58 | 0.015 microfarad. |
| | 62 | 0.005 microfarad. |
| | 64 | 1400–3055 micromicrofarad. |
| | 84 | 0.2 microfarad. |
| | 86 | 0.2 microfarad. |
| | 98 | 0.2 microfarad. |
| | 114 | 0.2 microfarad. |
| | 116 | 0.2 microfarad. |
| | 130 | 0.02 microfarad. |
| | 152 | 0.1 microfarad. |
| | 162 | 0.5 microfarad. |
| Transistors | 54 | 2N43. |
| | 56 | 2N43. |
| | 88 | 2N43. |
| | 90 | 2N43. |
| | 92 | 2N43. |
| | 140 | 2N43. |
| | 142 | 2N43. |
| | 146 | 2N43. |
| | 144 | GT949. |

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a web width sensing system, in combination, a source of alternating waves, a pair of differentially connected linearly variable differential transformers connected to said source, each said transformer having a movable magnetic core normally located in a null position such that no output is produced by either transformer while the cores are in the null positions, bearing members rigidly attached respectively to said movable cores, means for passing a moving web between said bearing members, means supporting said bearing members with said bearing members free to follow the edges of said web, means for deriving an output from said transformers having an amplitude which is a function of a change in the width of said web from a predetermined value with said output substantially independent of lateral motion of said web, means coupled to said source for providing a steady reference voltage, means for comparing said output and said reference voltage and for providing therefrom periodic pulses representative only of any excess of said output over said reference voltage, means for integrating groups of said pulses, means for establishing a reference level, and means for producing an indication when the integrated value of said pulses exceeds said reference level.

2. In a web width sensing system, in combination, a source of alternating waves, a pair of differentially connected linearly variable differential transformers connected to said source, each said transformer having a movable magnetic core normally located in a null position such that no output is produced by either transformer while the cores are in the null positions, bearing members rigidly attached respectively to said movable cores, means for passing a moving web between said bearing members, means supporting said bearing members with said bearing members free to follow the edges of said web, means for deriving an output from said transformers having an amplitude which is a function of a change in the width of said web from a predetermined value with said output substantially independent of lateral motion of said web, means coupled to said source for providing a steady reference voltage, periodic means for comparing said output with said reference voltage and for producing pulses proportional to any instantaneous excess of said output over said reference voltage only when said output exceeds said reference voltage, means for integrating said pulses over a plurality of cycles of said periodic means, means for comparing the integrated sum of said pulses with said reference level, and means for producing an indication when the integrated sum exceeds said reference level.

3. In a web width sensing system, in combination, a source of alternating waves, a pair of differentially connected linearly variable differential transformers connected to said source, each said transformer having a movable magnetic core manually located in a null position such that no output is produced by either transformer while the cores are in the null positions, bearing members rigidly attached respectively to said movable cores, means for passing a moving web between said bearing members, means supporting said bearing members with said bearing members free to follow the edges of said web, means for deriving an output from said transformers having an amplitude which is a function of a change in the width of said web from a predetermined value with said output substantially independent of lateral motion of said web, means coupled to said source for providing a steady reference voltage, periodic means for comparing said output with said reference voltage and for producing pulses proportional to any instantaneous excess of said output over said reference voltage only when said output exceeds said reference voltage, means for integrating said pulses to provide a second output representative of the duration and amplitude thereof, means for reducing said amplitude between pulses at a predetermined rate, means for establishing a reference level, and means for producing an indication when said second output exceeds said reference level.

References Cited in the file of this patent

UNITED STATES PATENTS 2,289,737 Sorkin _____ July 14, 1942

(Other references on following page)

UNITED STATES PATENTS

| | | |
|---|---|---|
| 2,410,249 | Spencer | Oct. 29, 1946 |
| 2,503,851 | Snow | Apr. 11, 1950 |
| 2,564,221 | Hornfeck | Aug. 14, 1951 |
| 2,569,228 | Clark | Sept. 25, 1951 |
| 2,648,058 | Breedlove | Aug. 4, 1953 |
| 2,824,299 | Haines et al. | Feb. 18, 1958 |
| 2,848,815 | Scheu | Aug. 26, 1958 |
| 2,876,551 | Bowlby | Mar. 10, 1959 |
| 2,903,522 | Flower | Sept. 8, 1959 |
| 2,909,623 | Blecher | Oct. 20, 1959 |

FOREIGN PATENTS

| | | |
|---|---|---|
| 748,612 | Great Britain | May 9, 1956 |

UNITED STATES PATENT OFFICE
CERTIFICATE OF CORRECTION

Patent No. 3,100,889                              August 13, 1963

Maxwell R. Cannon

It is hereby certified that error appears in the above numbered patent requiring correction and that the said Letters Patent should read as corrected below.

Column 10, line 47, for "manually" read -- normally --.

Signed and sealed this 11th day of February 1964.

(SEAL)
Attest:

ERNEST W. SWIDER                          EDWIN L. REYNOLDS

Attesting Officer                        Acting Commissioner of Patents